United States Patent
Turk et al.

(10) Patent No.: US 6,415,271 B1
(45) Date of Patent: *Jul. 2, 2002

(54) ELECTRONIC CASH ELIMINATING PAYMENT RISK

(75) Inventors: James J. Turk, North Conway, NH (US); Geoffrey Turk, New York, NY (US)

(73) Assignee: GM Network Limited, Isle of Man (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/277,651

(22) Filed: Mar. 26, 1999

Related U.S. Application Data

(63) Continuation-in-part of application No. 08/921,760, filed on Aug. 26, 1997, which is a continuation-in-part of application No. 08/465,430, filed on Jun. 5, 1995, now Pat. No. 5,671,364, which is a continuation-in-part of application No. 08/015,588, filed on Feb. 10, 1993, now abandoned.

(51) Int. Cl.[7] .......................................... G06F 153/00
(52) U.S. Cl. .............................. 705/39; 705/68; 705/69
(58) Field of Search ............................. 705/26, 22, 39, 705/41, 43, 68, 69; 380/4, 24, 25, 30, 29; 235/379, 380

(56) References Cited

U.S. PATENT DOCUMENTS

| | | | | |
|---|---|---|---|---|
| 4,023,013 A | * | 5/1977 | Kinker | 235/379 |
| 4,314,352 A | * | 2/1982 | Fought | 235/379 |
| 4,503,503 A | | 3/1985 | Suzuki | 705/400 |
| 4,529,870 A | | 7/1985 | Chaum | 235/380 |
| 4,759,063 A | | 7/1988 | Chaum | 380/30 |
| 4,759,064 A | | 7/1988 | Chaum | 380/30 |
| 4,851,999 A | | 7/1989 | Moriyama | 705/30 |
| 4,914,698 A | | 4/1990 | Chaum | 380/30 |
| 4,926,480 A | | 5/1990 | Chaum | 380/23 |
| 4,947,430 A | | 8/1990 | Chaum | 380/25 |
| 4,949,380 A | | 8/1990 | Chaum | 380/30 |

(List continued on next page.)

FOREIGN PATENT DOCUMENTS

EP    0518365 A2 * 12/1992

OTHER PUBLICATIONS

William; "The rise of electronic payments networks and the future role of the Fed with regard to payment finality"; Econnmic Review ; Dialog File 15, Accession No. 00739433, Mar. 1993.*

George et al; "A primer on the settlement of payments in the United States"; Federal Reserve bulletin; col. 77, No. 11, Nov. 1991.*

(List continued on next page.)

Primary Examiner—Kyle J. Choi
Assistant Examiner—Romain Jeanty
(74) Attorney, Agent, or Firm—St. Onge Steward Johnston & Reens LLC

(57) ABSTRACT

A system and method to allow gold to circulate as digital cash through the global computer network (Internet) and/or private communication networks, in both hardwired and wireless systems, much like cash currently circulates in the physical world. A computer system is structured to allow the system user who is attached to the network to transfer digital data values based on gold units of account to or from a portable electronic device, such as a smartcard, and to or from other system users having compatible electronic devices. The sum total of all circulating digital data values will equal the weight of all the gold held for safekeeping at the storage site(s) for the users of the bank. The ownership of the electronic gold values is not transferred by a computer system executing debits and credits between individual accounts, but instead by individuals directly transferring the digital data values amongst themselves (as is done in cash transactions, i.e., without double-entry bookkeeping).

17 Claims, 1 Drawing Sheet

U.S. PATENT DOCUMENTS

| | | | | |
|---|---|---|---|---|
| 4,977,595 A | | 12/1990 | Ohta et al. | 380/24 |
| 5,010,485 A | | 4/1991 | Bigari | 364/408 |
| 5,030,806 A | * | 7/1991 | Collin | 235/375 |
| 5,131,039 A | | 7/1992 | Chaum | 380/23 |
| 5,179,698 A | * | 1/1993 | Bachman et al. | 705/39 |
| 5,220,501 A | * | 6/1993 | Lawlor et al. | 705/40 |
| 5,224,162 A | | 6/1993 | Okamoto et al. | 380/24 |
| 5,276,736 A | | 1/1994 | Chaum | 380/24 |
| 5,303,383 A | | 4/1994 | Neches et al. | 395/500 |
| 5,453,601 A | * | 9/1995 | Rosen | 705/69 |
| 5,455,407 A | * | 10/1995 | Rosen | 705/69 |
| 5,493,614 A | | 2/1996 | Chaum | 380/30 |
| 5,521,980 A | | 5/1996 | Brands | 380/30 |
| 5,539,825 A | | 7/1996 | Akiyama et al. | 380/24 |
| 5,623,547 A | * | 4/1997 | Jones et al. | 705/68 |
| 5,666,493 A | | 9/1997 | Wojcik et al. | 705/26 |
| 5,671,364 A | * | 9/1997 | Turk et al. | 705/39 |
| 5,812,668 A | | 9/1998 | Weber | 380/24 |
| 5,832,089 A | | 11/1998 | Dravitz et al. | 380/24 |
| 5,850,446 A | | 12/1998 | Burger et al. | 380/24 |
| 5,898,154 A | * | 4/1999 | Rosen | 705/69 |
| 5,983,207 A | * | 11/1999 | Turk et al. | 705/39 |
| 6,122,625 A | * | 9/2000 | Rosen | 705/68 |

OTHER PUBLICATIONS

William; "the rise of electronic payments setworks and the future role of the Fed with regard to payment finality", 1993, Economic Review V78n2 pp: 1–22; Dialog file 15, Accession No. 00739433.*

O'Mahony et al "Electronic Payment Systems", 1997, Artech House, Inc., pp. 146–147.*

DigiCash—Company Brochure "DigiCash—Numbers That Are Money" Jun. 11, 1997; 4 pages.

* cited by examiner

ELECTRONIC CASH ELIMINATING PAYMENT RISK

RELATED APPLICATIONS

This is a continuation in part of our application Ser. No. 08/921,760, filed Aug. 26, 1997, which is a continuation in part of application Ser. No. 08/465,430, filed Jun. 5, 1995 now U.S. Pat. No. 5,671,364; which is a continuation in part of application Ser. No. 08/015,588, filed Feb. 10, 1993, now abandoned.

FIELD OF THE INVENTION

This invention relates to electronic transaction systems, and more specifically to a system using an asset-based electronic cash system, for settlement of payment obligations.

BACKGROUND OF THE INVENTION

In the historic past, precious metals circulated as currency. The metals circulated mainly in the form of coins, and over time improvements were made to coins to improve their reliability. These improvements included, for example, detailed engraving on the face and obverse of the coin, and milling of edges. These improvements were intended to prevent the clipping of coins, which was a process that lightened the weight of the coin. When this practice occurred, the coin was debased, i.e., it lost purchasing power because the coin no longer constituted the weight of gold it was purported to constitute.

The circulation of precious metals coins was in time supplanted by certificates during the period from 1680–1840. By this method of currency, the coins of precious metal remained in safe and secure storage, typically a vault facility maintained by a bank or warehouse company. A certificate of deposit, a paper document, was issued by the bank or warehouse company and evidenced the deposit of coin that had been made into the facility, and the certificate of deposit began circulating as a substitute for the coin. Circulation of the certificate, in lieu of the coins, offered numerous advantages. Paper was easier to transport, and a relatively small amount of certificates could be used to complete transactions of high value. There was less risk of debasement of the coin that was stored. However, while these advantages significantly improved the circulating medium, there were also disadvantages. These included forgery of paper certificates, fraud and bankruptcy of the bank or warehouse company.

As a result, another improvement to currency soon emerged. This improvement in the nature of currency was the creation of deposit currency. Deposit currency is a process that enables paper money and/or coin to circulate as currency. By this method of currency, the coins of precious metal and/or the paper currency that represented a claim to those coins, remained in safe and secure storage, typically a vault facility maintained by a bank. Circa 1840 to the present, the circulation of coin and paper money for commercial transactions was supplanted by deposit currency, i.e., money is now moved around mainly by checks and wire transfers.

The creation of deposit currency significantly improved the circulating medium. It was no longer necessary to extensively rely on coins, which could be clipped, debased, etc., nor on paper money, which could be counterfeited. By moving monetary units of account on deposit in one bank to another bank, the process of payments was significantly enhanced.

However, in time unforeseen problems have appeared which detract from the use of deposit currency as a medium of exchange. The institutions in which clients lodge their money and deposit currency sometimes are unable to meet their commitment to their clients to return the clients' coin or paper money. The institutions, typically banks, which accept the deposits of coin and paper money from their client, loan the coin and paper money to other clients. Occasionally these borrowers failed to repay their loans, causing the bank to take a loss. Cumulatively these losses can be large enough to cause the bank to fail. A bank in that case no longer has sufficient coin or paper money to repay its liabilities to its clients.

The above described scenario constitutes what is known as "payment risk." As illustrated above, payment risk arises in conventional banking systems where a financial institution accepts deposits, then in turn loans out that money to others. This is known as "fractional banking," in that the financial institution only keeps on hand a fraction of the actual assets it is holding for the account of its depositors. If the financial institution fails due to bad loans or fraud, the financial institution lacks sufficient assets to pay off its depositors. This practice has lead to significant losses in connection with financial institution failures such as at the Herstatt Bank in Germany and the BCCI scandal.

A related payment risk arises due to the fluctuating value of national currencies due to inflation and currency exchange rate variations dependent on the economy of the nation issuing the currency. Thus, there is a risk inherently associated with the use of national currencies.

A further problem of current payment systems is the problem of "float.""Float" is the amount of time a payee must wait for a transaction to be processed. This is considered an expense because of the unavailability of funds, which represents opportunity costs.

In order to eliminate these payment risks and float, James Turk has previously described, and patented in U.S. Pat. No. 5,671,364, a system which uses an asset (like gold) instead of a liability (national currency) for settling payments in a book-entry accounting system.

However, situations exist in which using a book-entry system for payments may be inexpedient or disadvantageous. In many cases, the payer and/or payee in a transaction may not want to be identified with a specific payment, preferring instead to remain anonymous. Currently, paper cash and metal coins provide such privacy in a transaction. Electronic cash also provides such privacy, although the payee can make himself known to the issuing financial institution as the recipient of anonymous funds when he redeems an electronic note for cash or other payment.

Also, smaller payments (generally considered to be amounts of less than U.S. $10) may be uneconomical to process through a book-entry system, because double-entry bookkeeping generally involves relating particular credits and debits to particular accounts, i.e., correctly identifying the payer and the payee with each transaction and the amounts involved. The cost of knowing the identities of customers is high if it requires human operators to verify this information.

Recent advances in the field of cryptography have made possible the secure and privacy-protected transfer of digital information over insecure, open communication channels such as the global computer network known as the "Internet", by using public key encryption technologies. Specific techniques for applying encryption methods to a gold-based electronic cash system have been disclosed in our co-pending application Ser. No. 08/921,760, filed Aug. 26, 1997. As discussed in our prior application, a system and method are proposed to allow gold to circulate as digital cash through the global computer network (Internet) and/or private communication networks much like cash currently circulates in the physical world. In that system, a computer system (the "emint") will create digital representations of gold (ecoins). Each ecoin will represent a weight of gold held at a participating secure storage facility, and each ecoin is given by the emint a unique Digital Hall mark™ by which it can be distinguished and identified. The sum total of all circulating ecoins (denominated in physical measures such as weights such as grams and/or ounces and fractions thereof) will equal the weight of all the gold held for safekeeping at the storage facilities for the users of the emint. The ownership of gold is not transferred by a computer system executing debits and credits between individual accounts, but instead by individuals directly transferring ecoins amongst themselves (as is done in cash transactions, i.e., without double-entry bookkeeping).

Apart from the system described in our copending application, several kinds of cashless financial transaction systems, not based on gold or other valuable commodities, are also available. These include credit cards and debit cards which customers may use with a wide range of retailers. Each transaction of this type is accompanied by the provision of customer account details required for the actual transfer of funds between the specific customers and the specific retailers. Another form of cashless payment system is the prepaid card system, where a card is purchased prior to a series of transactions and a value record recorded on it is appropriately decremented on each transaction. Phone cards and subway pass cards are common examples of prepaid cards currently in use.

Another form of a cashless financial transaction system, not based on gold or other valuable commodities, is the smart card system. Smart cards are integrated circuit cards used in an electronic cash transfer system. In these systems, such as the Mondex® system used in Europe, data stored in the user's smart cards represents a cash value which can be transferred on-line with banks and off-line between cards.

Various proposals have been put forward to allow the interchange of money values between smart cards and/or "electronic purses". For example, U.S. Pat. No. 4,839,504 discloses a system where a user is able to download money value on to an integrated circuit card (otherwise known as a smart card), by communication with his bank. At the bank the same value is debited from an account of the user. Purchases are made by the user by transfer of money values from the smart card to retailer equipment off-line from the bank. The retailer retains details of the transaction (including the purchasers identity) and claims funds from the issuing bank by presenting a list of transaction details. An account reconciliation is required to allow the account of the appropriate purchaser to be adjusted.

Procedures which, as above, require ultimate account reconciliation for every transaction are attended by two disadvantages. The first is practical. The storing, transmitting and reconciling of purchaser details for every transaction places an impossible burden on equipment if all cash type transactions are contemplated. Processing all such transactions efficiently in an acceptable time is not possible, even with the most modem equipment. The second objection is social. The anonymity of cash would be lost and potential would exist for details of personal spending habits to be derived.

The second of the above objections has been addressed by Chaum, by a blind signature protocol that has been developed so that the certifying financial institution cannot determine the note which it has certified, allowing the user to maintain his privacy. In such systems the user "blinds" the note he submits to the financial institution for its digital signature, the financial institution applies its digital signature to certify the note, and the user then unblinds the note and uses it to make a payment to a payee. The blind signature system is described in Chaum, U.S. Pat. No. 4,759,063. However, a problem remains in that double payment by a purchaser must be detectable. Chaum allows for this problem by including, in the data transferred in an off-line transaction, encrypted information concerning the purchaser. This information is relayed to the bank when the retailer claims credit and is used at the bank to detect double use of the same "electronic cash".

Smart cards are typically operated to transfer value to and from their corresponding bank accounts or to other smart cards by means of an interface to a terminal device whereby power, clock signals, a reset signal and serial data signals may be applied to the card. Generally the interface incorporates a set of electrical contacts for direct temporary electrical connection. However, wireless interfaces are also possible. In such an arrangement clock, reset and data signals may be transmitted by radio signals, optical signals, or even ultrasonic signals.

It would be desirable to provide payment systems with the benefits of elimination of the payment risk and problems of float described above, coupled together with ease of use in small value transactions as is associated with smart cards.

OBJECTS OF THE INVENTION

Accordingly, it is an object of the present invention to increase efficiency and surety of payment systems by creating a class of digital transaction systems whose units of account are assets, as opposed to all other current electronic cash whose units of account are liabilities, thereby eliminating problems of payment risk inherent in current banking and electronic cash systems.

SUMMARY OF THE INVENTION

In accordance with one embodiment of the invention, a commodity based payment system comprises: at least one deposit site having secure facilities for storage of a valuable commodity; an amount of a commodity stored at the deposit site; and a computer system for implementing and recording transactions defined in units of the commodity. The accounting of the transactions is denominated in units of the commodity. The commodity comprises a precious metal, such as silver, or most preferably, gold of a specified purity. The system permits remote access to transfer account values from a bank account to a portable electronic device, and the transfer of such values from one device to another. The portable electronic device can include a portable computer, or smaller computing and/or electronic devices such as a personal digital assistant ("PDA") or a smart card. The remote terminal can connect to the system either by land lines or by wireless networking methods.

Other objects, aspects and features of the present invention in addition to those mentioned above will be pointed out in or will be understood from the following detailed description provided in conjunction with the accompanying drawings.

DETAILED DESCRIPTION OF THE INVENTION

Figure 1:
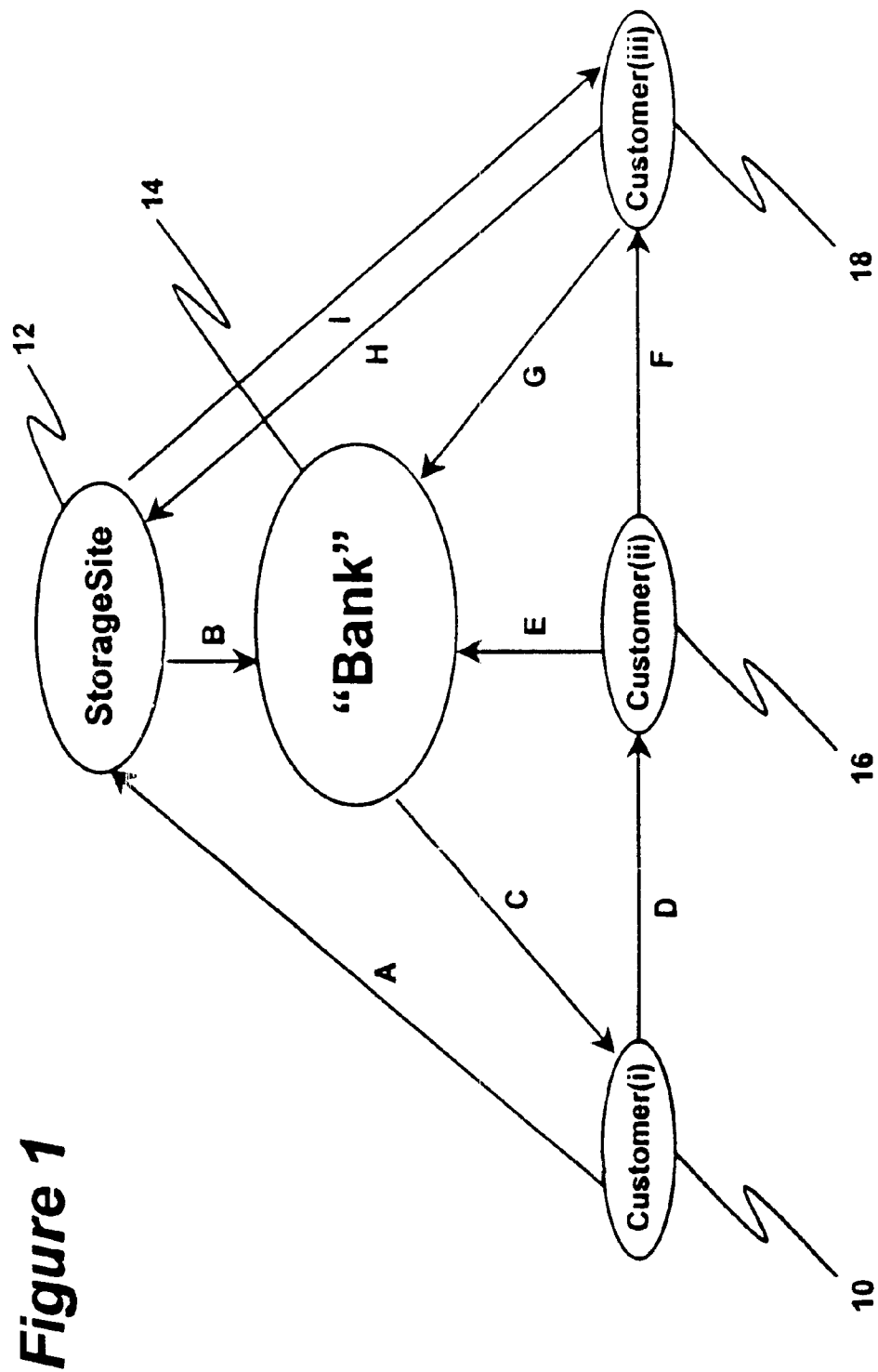
FIG. 1 shows a flowchart illustrating the operation of an asset-based electronic cash system in accordance with the invention.

A Glossary of the Terms Used in the Present Application is Provided Hereafter "Book-entry system"—also called "double-entry bookkeeping," is a book-keeping method of accounting in which a debit in one individual's account is also entered as an equivalent credit in another individual's account, and vice versa. All banks currently use this method of accounting when handling currency payments with other banks as well as between customers within the same financial institution.

"Public key" is a mathematical key which is available publicly and which is used to verify digital signatures created with the matching private key. In the context of encrypted communications the public key is used to encrypt electronic data which can only be decrypted using the matched private key.

"Private key" is a mathematical key which is kept private to the owner and which is used to create digital signatures. In the context of encrypted communications, the private key is used to decrypt electronic data encrypted with the corresponding public key.

"Public key cryptography" is a technique for encrypting data by which the key used to decrypt the message is different from the key used to encrypt the message. A digital signature is an application of public key cryptography in that the key used to verify the signature is different from the key used to sign the signature. Public key encryption methods have been developed for use in electronic cash. In one such method known as the RSA algorithm, encryption and decryption are accomplished by two mathematical equations which are related as inverses of each other. These equations are the private key, used by the issuing financial institution to digitally sign, or certify, a note, and the related public key, used by the recipient to determine and verify the existence of a valid signature on the note. Such protocols are known in the art and are described for example in Chaum, U.S. Pat. No. 4,759,063. A blind signature protocol has been developed so that the certifying financial institution cannot determine the note which it has certified, allowing the user to maintain his privacy. In such systems the user "blinds" the note he submits to the financial institution for its digital signature, the financial institution applies its digital signature to certify the note, and the user then unblinds the note and uses it to make a payment to a payee. A blind signature system is described in Chaum, U.S. Pat. No. 4,759,063, and is in commercial use by DigiCash b.v. of the Netherlands. In order to prevent a user from spending the note more than once, methods have been developed for testing the note to determine if it has already been spent. In one such system, if a note is spent twice, the identity of the user is revealed. Such a system is more suitable for lower value payments and is disclosed for example in Chaum, U.S. Pat. No. 4,914,698. For higher value payments, the payee will verify the status of the received note with the issuing financial institution, which will keep a database of issued and spent notes. In summary, such public key cryptography systems allow an issuing financial institution to digitally sign an electronic note with its secret key such that the user, and the ultimate payee, can verify the authenticity of the note and the ability to make payment. The blinding protocol protects the user's privacy by preventing the financial institution from tracing a note subsequently presented to it for payment as cash.

A "storage site" as used herein is a secure facility (e.g., a vault) in which the valuable commodity (e.g., gold) is held for safekeeping. Preferably there are several storage sites for storing the commodity. The storage sites are preferably located in countries having secure and stable political systems where there is minimal risk of misappropriation of the asset by the government or private persons. The storage sites will typically be a precious metal repository; however, other secure vault facilities could also serve as the storage site. Typical site locations would be London, New York, Zurich and Tokyo, as well as other locations. The storage site provides facilities for safe and secure storage of the commodity to be used as the asset basis for the electronic cash. Typically such storage site consists of a protected vault. The precious metal repository or protected vault that is servicing the system users will have the ability to (1) receive the commodity from a client, (2) return the commodity to a client, (3) test the purity of the commodity, (4) measure the weight and/or other physical properties of the commodity, (5) provide identifying information for each parcel of the commodity placed within the storage site in order to distinguish between the different parcels belonging to the different clients of the storage site, (6) report to the bank and/or client the quantity of the commodity stored by the client at the storage site, and (7) provide identifying information and the capability to physically separate from the total quantity of the commodity stored in the storage site those parcels of the commodity to be designated for use as currency. The valuable commodity stored at each storage site must be non-perishable, and most preferably has a high ratio of value to weight and volume. In a preferred embodiment, the commodity comprises a precious metal, such as platinum, palladium, or silver, or most preferably, gold of a specified purity. In the following portions of the specification, gold is used for clarity of discussion, but it is to be appreciated that other precious metals, tangible assets, and valuable commodities could also be used.

The "bank" is a organization which creates account relationships with its clients and maintains information received from the storage sites regarding gold (or other commodity) held there for storage and specifically identified for use in the system. The system of the invention requires the system users to establish a fiduciary relationship with the bank. The relationship is confirmed when a system user either (1) stores gold with, or (2) purchases, from another person, gold already held at one or more storage sites. In the first case, the storage site verifies the receipt of the gold and provides confirmation to the system user specifying the pure weight and/or other physical attributes of the gold. In the second case, the storage site records the transfer of gold from one system user to the other. Then the system user informs the bank and/or storage site that he wishes to allocate some or all of his gold for use in the electronic cash system. The storage site will likely separate this specific weight of gold to be used as currency in a separate area of the vault, designated solely for storing gold in use as electronic cash issued by the bank. The bank is aware from the storage site of the exact weight of gold available in the client's account to be used as electronic cash.

Electronic cash is downloaded by the client from the bank and is held in the portable electronic device, which in one preferred embodiment, comprises a smart card (sometimes also called an "electronic purse"). The downloading occurs via a computer network that gives access to the client's account at his bank. The network can be any one or more of a number of multiple possible network systems, including a closed network (such as an Ethernet network), or via an open network (such as the internet), or via telephone or cable modem lines to a closed or open network, or via wireless communications systems (such as a wireless modem) to either a closed or open network. During this process value is transferred electronically from the bank account of the client to his smartcard. The value stored in the smartcard can then be transferred via an intermediary device to a smartcard owned by another person, such as a private individual or a retail store. In the Mondex® system, such transfers are accomplished using an intermediary electronic device known as a "wallet," into which is inserted the smartcards of both the transferring and receiving persons. The users' security codes and the amount of cash to be transferred are entered into the keypad of the wallet, and the process of value transfer is triggered. The electronic cash can later be transferred by the recipient from his smart-card back to his account at the bank via the computer network as desired. Thus, the system allows for an offline transfer of value between the client and the recipient. Transfer may be made by direct electronic connection between smartcards using a wallet, or by telephone connection using modems or by wireless communication using radio or optical signals. The smartcards may also be used for Internet purchases with appropriate attachments to a computer connected to the Internet.

Key features of a satisfactory electronic cash system are accuracy, anonymity and security. Security is a particular problem when value messages in the system are broadcast by radio, magnetic or optical/infra-red signals as would be required in a remote, wireless transaction. A possible electronic cash system with sufficient security is described in patent application Nos. WO91/16691 and WO93/08545 which contemplates anonymous transactions and security ensured by a public key encryption system.

This invention therefore provides a system and method of settling of payments for transactions without requiring a book entry system of account management. This provides the desirable feature of anonymity in transactions, while still maintaining the necessary confidentiality. In addition, the present invention offers system users: (1) the ability to complete a payment without incurring the risk now inherent in existing mechanisms used to complete payment transactions, (i.e., possible loss of funds deposited in a bank which is seized or which is insolvent); (2) the ability to pay or receive an immediate value; (3) the ability to use an electronic currency without being exposed to the practice of fractional reserve banking (wherein banks do not keep as a reserve assets equal to the amount and identity of their liabilities) and thereby avoid the risks of partial or total loss of the deposit as a result of the overissue of the currency (where banks create liabilities for currency based on assets which they do not have on hand); and (4) the ability to use gold and/or other commodities as electronic currency.

As noted above, gold is the preferred commodity as it is a low-risk medium of payment and it has a known value. Gold extinguishes the obligation arising from a transaction in trade and commerce. When the seller receives gold, there is no further obligation because the product sold has been exchanged for a tangible as set. However, a national currency does not necessarily extinguish the obligation incurred when the buyer acquires a product. The seller does not receive a tangible asset. When the seller instead receives a national currency, the seller receives a promise to pay, which is principally dependent upon the central bank which issues the national currency. The obligation can be further at risk if the payment clearing bank is unable to meet its obligations to deliver the currency specified in a transaction.

An example of an asset based electronic cash system in accordance with the invention is shown in FIG. 1. Customer (i) 10 stores gold at a storage site 12 and requests the storage site to send him digital data representing certain specific values of gold, not to exceed the value of the stored gold. (arrow A). The storage site contacts the bank 14 and informs it of the receipt of new gold (arrow B).

The bank creates digital data representing the requested gold values, whose total sum represents the exact weight of new gold and transfers the digital data via a computer network (potentially even a bank ATM system) to Customer (i) (arrow C), who stores the data in a smartcard.

Once Customer(i) receives the digital data, he can transfer all or a portion of the value of the digital data encoded in the smartcard to another Customer(ii) 16, who also has a smartcard, for the payment of goods and/or services (arrow D). Customer(ii) then can send the digital data to the bank for storage in Customer (ii)'s account (arrow E), or, it can be further transferred to another Customer(iii) 18, who also has a smartcard, for the payment of additional goods and/or services (arrow F). Customer(iii) also has the option of further use of the digital date values or the transfer of the digital data to be stored in connection with an account at the bank 14 (arrow G). A customer, such as Customer(iii), can redeem the digital data value for gold bullion (arrow H), or if desired into a national or regional currency (such as the Euro). The storage site then ships the specified weight of gold bullion to the individual who requested it (arrow 1), or enters a credit for an amount of gold held for safe-keeping for Customer (iii) at the storage site, or takes such other actions as instructed.

The system uses a tangible asset (i.e., a defined weight of gold) as the basic monetary unit of account. The system is comprised of assets that are owned by the system users and circulate as currency. In other words, the system does not monetize debts and thereby turn the debt obligations of borrowers into currency. The total currency available for circulation within the system is the total weight of gold owned by the system users. This ability to circulate assets as currency illustrates a unique advantage available to users of the invention. The use of assets as currency provides certainty that payments will be made as directed and without risk. The net result of this transaction is that gold is circulating as currency. Gold is used as a monetary unit of account in a transaction of trade and commerce entered into between A and B, and it therefore is circulating as currency even though it remains in safe and secure storage.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. An asset based electronic cash system comprising:
   at least one storage site having secure facilities for storage of a valuable commodity;
   an inventory of a valuable commodity stored in said secure facilities at a said storage site;
   a distributed computer system having:
      central computer means for maintaining records of the amount of said inventory of a valuable commodity stored in said secure facility;
      said central computer means having means for creating a first electronic data representing a first specified value of said valuable commodity;

means for transmitting said first electronic data from said central computer means to a portable electronic device of a first system user via a computer network;

means for-transferring a second electronic data representing a second specified value of said valuable commodity from said first system user to an electronic device of a second system user;

means provided in said central computer means, for receiving a third electronic data representing a third specified value of said valuable commodity, from said electronic device of said second system user;

the total value of all electronic data in said system being less than or equal to the amount of said inventory of a valuable-commodity stored in said secure facility; said as set based electronic cash system permitting entities to conduct financial transactions by transfer of electronic data representing a value of said valuable commodity, whereby payment risk is eliminated.

2. A system in accordance with claim 1 where said valuable commodity comprises a precious metal.

3. A system in accordance with claim 2 wherein said precious metal comprises gold.

4. A system in accordance with claim 1 wherein said portable electronic device comprises a portable computer, a personal digital assistant or a smart card.

5. A system in accordance with claim 1 wherein said portable electronic device is connected to said computer system by a wireless network.

6. A system in accordance with claim 1 wherein said portable electronic device is connected to said computer system by a hard wired network.

7. A system in accordance with claim 1 wherein said portable electronic device is connected to said computer system by a private network.

8. A system in accordance with claim 1 wherein said portable electronic device is connected to said computer system by a public network.

9. A system in accordance with claim 1 wherein said portable electronic device is connected to said computer system by the Internet.

10. An asset based electronic cash system comprising:

at least one storage site having secure facilities for storage of a valuable commodity;

an inventory of a valuable commodity stored in said secure facilities at a said storage site;

a distributed computer system having:

central computer means for maintaining records of the amount of said inventory of a valuable commodity stored in said secure facility;

said central computer means having means for creating a first electronic data representing a first specified value of said valuable commodity;

means for transmitting said first electronic data from said central computer means to a smartcard of a first system user via a computer network;

means for transferring a second electronic data representing a second specified value of said valuable commodity from said first system user to a smartcard of a second system user;

means provided in said central computer means, for receiving a third electronic data representing a third specified value of said valuable commodity, from said smartcard of said second system user;

the total value of all electronic data in said system being less than or equal to the amount of said inventory of a valuable commodity stored in said secure facility; said asset based electronic cash system permitting entities to conduct financial transactions by transfer of electronic data representing a value of said valuable commodity, whereby payment risk is eliminated.

11. A system in accordance with claim 10 where said valuable commodity comprises a precious metal.

12. A system in accordance with claim 11 wherein said precious metal comprises gold.

13. A system in accordance with claim 10 wherein said smartcard is connected to said computer system by a wireless network.

14. A system in accordance with claim 10 wherein said smartcard is connected to said computer system by a hard wired network.

15. A system in accordance with claim 10 wherein said smartcard is connected to said computer system by a private network.

16. A system in accordance with claim 10 wherein said smartcard is connected to said computer system by a public network.

17. A system in accordance with claim 10 wherein said smartcard is connected to said computer system by the Internet.

* * * * *